United States Patent Office 3,549,659
Patented Dec. 22, 1970

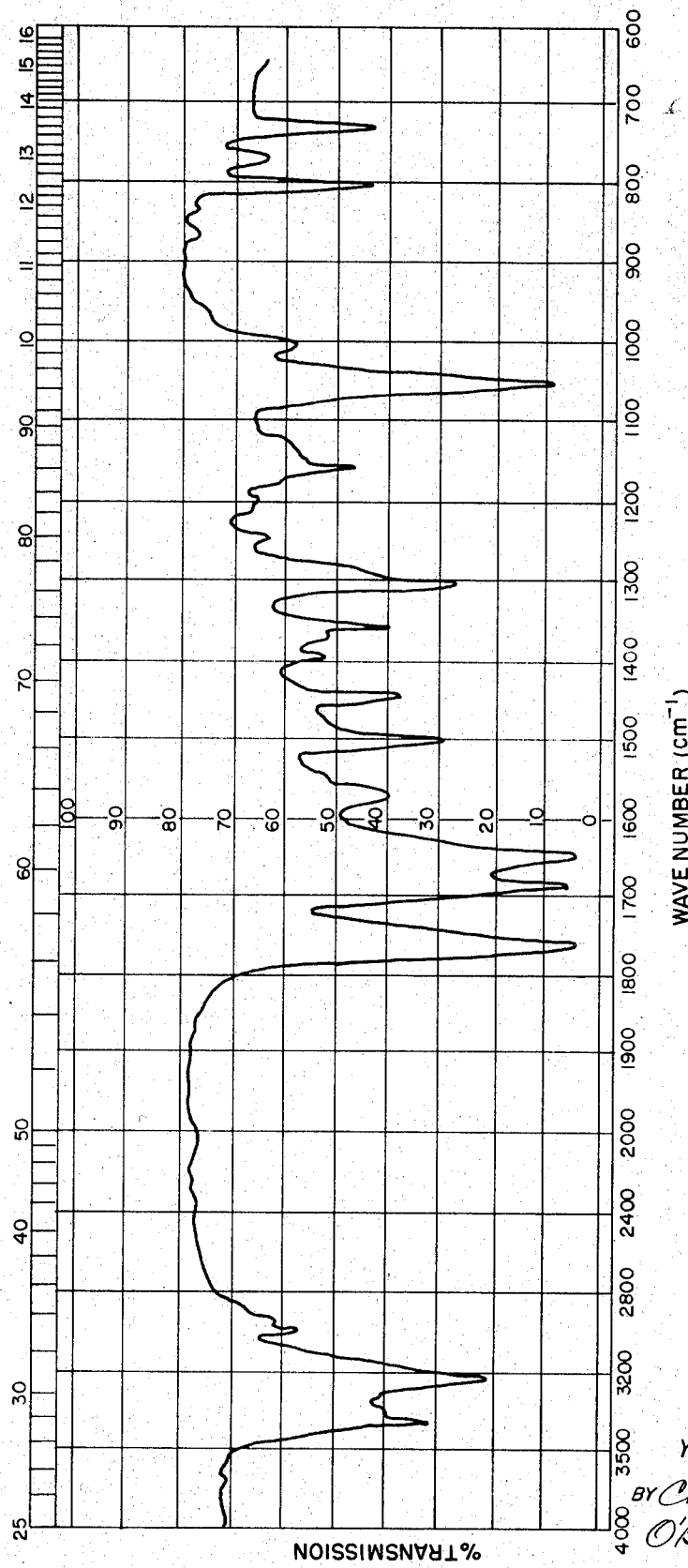

3,549,659
ALPHA-ALKOXYCARBONYL BETA-IMINO GAMMA-BUTYROLACTONES AND PROCESS FOR PRODUCING THE SAME
Yoshikazu Isowa, Tokyo, Japan, assignor to Toyo Koatsu Industries, Incorporated, Tokyo, Japan, a corporation of Japan
Filed July 25, 1967, Ser. No. 655,922
Claims priority, application Germany, July 29, 1966, S 105,116
Int. Cl. C07d 5/06
U.S. Cl. 260—343.6
10 Claims

ABSTRACT OF THE DISCLOSURE

Novel alpha-alkoxycarbonyl beta-imino gamma-butyrolactones obtained by decomposing metal chloride coordination complexes formed by alpha-halonitriles or cyanohydrins and malonates, with water or alcohols. These compounds are useful as herbicides.

---

This invention relates to novel alpha-alkoxycarbonyl beta-imino gamma-butyrolactones and to processes for producing the same.

The novel alpha-alkoxycarbonyl beta imino gama-butyrolactones are represented by the formula:

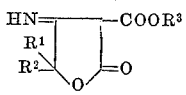

wherein $R^1$ and $R^2$ are selected from the group consisting of hydrogen, lower alkyl radicals containing 1–6 carbon atoms and preferably 1 to 3 carbon atoms or aryl radicals containing 6 to 20 carbon atoms and preferably 6 to 12 carbon atoms and $R^3$ is a lower alkyl radical containing 1 to 6 carbon atoms and preferably 1 to 4 carbon atoms.

The process comprises reacting nitriles represented by the general formula $R^1R^2C(Y)CN$ wherein $R^1$ and $R^2$ are defined above and Y is a halogen or a hydroxyl radical with malonates represented by the general formula $$CH_2(COOR^3)_2$$

wherein $R^3$ is defined above, in the presence of metal chloride coordination complexes represented by the formula $MCl_4$ and selected from the group consisting of $SnCl_4$ or $TiCl_4$, and followed by treating the resulting complexes with water or an alcohol.

Copending application Ser. No. 646,536, filed June 16, 1967 discloses the reaction of an aliphatic or aromatic nitrile represented by the general formula RCN wherein R is an alkyl, alkenyl or aryl radical and a malonate in the presence of a metal chloride represented by the general formula $MCl_4$, which is $SnCl_4$ or $TiCl_4$, to produce an imino compound metal chloride complex represented by the general formula:

$$RC(=NH)CH(COOR^3)_2 \cdot MCl_4$$

When the above-mentioned imino compound metal chloride complex is decomposed with water or an alcohol, $MCl_4$ will be removed and a beta-imino malonate is produced. The present invention expands the range of the nitriles of the previous invention to include alpha-halonitriles and cyanohydrins. According to the present invention, during the reaction of a nitrile and a malonate, the halogen or hydroxyl radical of the nitrile molecule further reacts with one of the alkoxy radicals of the malonate molecule: the alkly halide or alcohol is removed and a beta-imino gamma butyrolactone derivative is produced.

It is generally known that gamma-lactone derivatives may be prepared by dehydrating a gamma-hydroxycarboxylic acid derivative or removing hydrogen halide from a gamma-halogen carboxylic acid derivative. It is also known that a tetronic acid derivative may be obtained by condensing an alpha-hydroxycarboxylate and a malonate by Claisen's reaction using sodium or sodium alcoholate as a condensing agent. The present process of reacting an alpha-halonitrile or cyanohydrin and a malonate in the presence of stannic chloride or titanium tetrachloride is an entirely new method for preparing novel gamma-butyrolactones.

The process of the present invention is conducted as follows:

A solution of equal mols of an alpha-halonitrile or cyanohydrin represented by the formula $R^1R^2C(Y)CN$ and a malonate is stirred while stannoic chloride or titanium tetrachloride is added dropwise into the solution and the temperature is maintained below 80° C. After the addition, the solution is heated to about 80 to 120° C. for a period of several minutes to several hours in order to complete the reaction. It is thought that the above-mentioned reaction proceeds according to the equations:

(I) 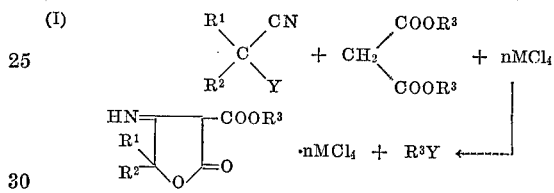

to produce a metal halide complex of an alpha-alkoxycarbonyl beta-imino gamma-butyrolactone having the Formula I as determined from the results in Examples 5 and 6, which follow and n in Formula I is presumed to be 1.

However, in Examples 1, 2, 3 and 4, in which the raw material was a cyanohydrin, the complex was not produced with $n=1$, but what is thought to be a mixture of an alpha-alkoxycarbonyl beta-imino gamma-butyrolactone and $MCl_4$ in which n was about ½. This is thought to result because, cyanohydrin raw materials produce an alcohol by-produce during the reaction and some of the complex $n=1$ is decomposed by the alcohol by product. When the raw material is a cyanohydrin, the complex of $n=1$ can not be separated as is confirmed by Examples 1–4.

But in Examples 5 and 6, in which the raw material was an alpha-halonitrile, a complex of $n=1$ was substantiated and it is evident that the complex is produced by the reaction. Further, since the above-mentioned complex of $n=1$ cannot be separated as is confirmed it is not necessary to know the exact composition in order to pracatice the present invention. When the above-mentioned complex is dissolved in water or an alcohol at a temperature between room temperature and the boiling point of the alcohol, the complex will decompose and will produce an alpha-alkoxycarbonyl beta-imino gamma-butyrolactone, according to the following equation:

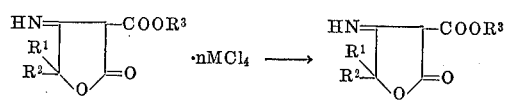

This product is separated as crystals from the alcohol or solvent solution and its structure confirmed from elemental analysis and by infrared absorption spectrum. Suitable alcohols for use in the present invention are aliphatic lower alcohols such as methanol, ethanol, propanol or isopropanol.

Suitable nitriles for use in the present invention as defined above include lactonitrile, acetocyanohydrin, 2- chloropropionitrile chloroacetonitrile, glycolonitrile, mandelonitrile, phenylchloroacetonitrile, bromoacetonitrile, phenylbromoacetonitrile, 2-methyl-2-phenyl lactonitrile and diphenyl chloroacetonitrile. The malonates, which are suitable for use in the present invention, include dimethyl malonate, diethyl malonate, dipropyl malonate, dibutyl malonate, dipentyl malonate and dihexyl malonate.

The following examples further illustrate the process of the present invention.

EXAMPLE 1

52 g. of stannic chloride was added with stirring into a mixture of 17 g. of acetocyanohydrin and 32 g. of diethyl malonate while maintaining temperature below 75° C. After all of the stannic chloride had been added, the mixture was heated to 90° C. and was maintained at that temperature until the reaction was complete. The crystals were separated and washed with ether yielding 50 g. of a white crystal product.

30 g. of these crystals were dissolved in a small amount of heated methanol. After treatment with activated carbon, 11.3 g. of needle-like crystals with a melting point of 260° to 261° C., were recrystallized from the solution.

The yield was 47% of the acetocyanohydrin raw material. Elementary analysis and infrared absorption spectrum confirmed that this product was alpha-ethoxycarbonyl beta-imino gamma, gamma-dimethyl gamma-butyrolactone represented by the structural formula:

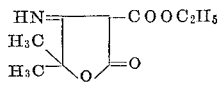

the theoretical value of anaylsis calculated for $C_9H_{13}NO_4$: were C, 54.25; H, 6.58; N, 8.03. The actual values were found to be C, 54.14; H, 6.60; N, 7.20.

Further, it was presumed from the results of elementary analysis and infrared absorption spectrum that reacting acetcyanohydrin, diethylmalonate and stannic chloride in this example produced a complex having the structural formula:

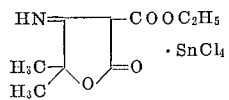

This complex was partially decomposed by the ethyl alcohol by-product to yield crystals. About ½ mol of $SnCl_4$ was eluted from the complex per 1 mol of the alcohol during the reaction.

The theoretical values of analysis calculated for $C_9H_{13}NO_4 + ½ SnCl_4$, were C, 32.18; H, 3.98; N, 4.25; Cl, 21.52. The actual values were found to be C, 32.12; H, 4.22; N, 4.25; Cl, 22.45.

EXAMPLE 2

52 g. of stannic chloride were dropped with stirring into a mixture of 14.5 g. of lactonitrile and 32 g. of diethyl malonate at a temperature maintained below 70° C., producting an increased viscosity until the mixture was a viscous syrup. After the dropping was completed, the mixture was heated and maintained at 90° C. for 2 hours, during which time it bubbled and then solidified. The reaction product was washed three times with ether to yield 52 g. of white crystals having a melting point of 162 to 164.5° C.

30 g. of these crystals were dissolved in a small amount of heated methanol, treated with activated carbon and were then recrystallized from the solution to yield 9.9 g. of white needlelike crystals having a melting point of 205 to 206° C.

The yield was 45% of the lactonitrile raw material. The results of the elementary analysis and infrared absorption spectrum confirmed this product to be alpha-ethoxycarbonyl beta-imino gamma-methyl gamma-butyrolactone represented by the structural formula:

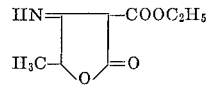

The theoretical values of analysis calculated for $C_8H_{11}NO_4$ were C, 51.88; H, 5.99; N, 7.56. The actual values were found to be C, 51.57; H, 5.86; N, 7.52.

Further, it was presumed from the results of elementary analysis and infrared absorption spectrum that reacting lactonitrile, diethyl malonate and stannic chloride in this example produced a complex having the structural formula:

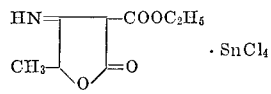

This complex was partially decomposed by the ethyl alcohol by-product of the reaction to yield the crystals. About ½ mol of $SnCl_4$ was eluted from the complex per 1 mol of the alcohol. The theoretical values of analysis for $C_8H_{11}NO_4 + ½ SnCl_4$ were C, 30.46; H, 3.51; N, 4.44; Cl, 22.48. The actual values were found to be C, 27.99; H, 3.49; N, 4.15; Cl, 24.92.

EXAMPLE 3

52 g. of stannic chloride were dropped with stirring into a mixture of 11.5 g. of glycononitrile and 32 g. of diethyl malonate at a temperature maintained below 65° C. causing the precipitation of white crystals. After all of the stannic chloride had been added the temperature was raised to 90° C. for 30 minutes during which time the entire product solidified. The heating was stopped and the reaction product separated and washed four times with ether to yield 45.0 g. of white crystals having a melting point of 171 to 173° C.

30 g. of these crystals were dissolved in a small amount of heated methanol. After treatment with activated carbon 11.4 g. of crystals of a melting point of 213 to 215° C. were recrystallized from the solution. The yield was calculated to be 52% of the glyconitrile. Elementary analysis and infrared absorption spectrum confirmed that this product was alpha-ethoxycarbonyl beta-imino gamma-butyrolactone represented by the following structural formula:

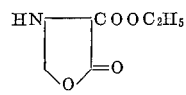

The theoretical values of analysis calculated for $C_7H_9NO_4$ were C, 49.12; H, 5.30; N, 8.18. The actual values were found to be C, 49.10; H, 5.13; N, 8.18.

The infrared absorption spectrum of this product is shown in FIG. 1 and compares with characteristic absorption bands gamma-butyrolactones at 1760, 1160 and 1050 cm.$^{-1}$ to support the above-mentioned structure.

Further, it was presumed from the results of elementary analysis and infrared absorption spectrum that reacting glycolonitrile, diethyl malonate and stannic chloride with one another in this example produced a complex having the structural formula:

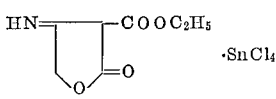

which was partially decomposed by the ethyl alcohol by-product ½ mol of $SnCl_4$ was eluted from 1 mol of the alcohol. The theoretical values of analysis for $C_7H_9NO + ½ SnCl_4$: were C, 27.89; H, 3.01; N, 4.65; Cl. 23.53. The actual values were found to be C, 27.40; H, 2.58; N, 5.04; Cl, 24.57.

EXAMPLE 4

52 g. of stannic chloride was dropped with stirring into a mixture of 30 g. of mandelonitrile [$C_6H_5CH(OH)CN$] and 32 g. of diethyl malonate at a temperature maintained below 70° C. producing an increased viscosity until the mixture was a viscous syrup. The mixture was then heated and maintained at 90° C. for 3 hours during which time is solidified.

The reaction product was washed with ether to yield 61 g. of a white solid, which decomposed above 200° C.

30 g. of this solid was dissolved in a small amount of heated methanol, treated with activated carbon and were crystallized from the solution to yield 10.6 g. of white needle-like crystals having a melting point of 184 to 185° C. were obtained. The yield was 39% of the mandelonitrile raw material. When recrystallized again from methanol, plate crystals of a melting point of 188 to 189° C. were obtained.

The results of the elementary analysis and infrared absorption spectrum confirmed that the product was alpha-ethoxy-carbonyl beta-imino gamma-phenyl gamma-butyrolactone represented by the structural formula:

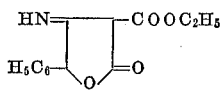

The theoretical values of analysis for $C_{13}H_{13}NO_4$: were C, 63.15; H, 5.30; N, 5.67. The actual values for the first recrystallization were found to be C, 62.99; H, 5.10; N, 5.17 and for the second to be C, 62.88; H, 5.37; N, 4.99.

The crystals produced by reacting mandelonitrile, diethyl malonate and stannic chloride were so difficult to refine that their structural formula could not be confirmed. But it was based upon the results of Examples 1, 2 and 3 and this example that the crystals were a residue obtained when a complex having the structural formula:

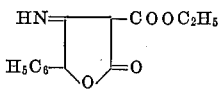

was first produced and was then partially decomposed by the ethyl alcohol by-product produced by the reaction eluding ½ mol of $SnCl_4$ from the complex per 1 mol of the alcohol.

EXAMPLE 5

26.1 g. of stannic chloride were dropped with stirring into a mixture of 7.5 g. of chloroacetonitrile and 16.0 g. of diethyl malonate at a temperature maintained below 60° C. After the stannic chloride was added, the temperature was raised to and maintained at 80° C. for 1 hour. The reaction product was separated and washed with ether to yield 39.8 g. of white crystals which decomposed at 270° C. The yield was 92% of the chloroacetonitrile raw material.

8.6 g. of these crystals were dissolved in 50 cc. of heated ethanol and recrystallized from the solution to yield 2.0 g. of white crystals of a melting point of 215 to 215° C. which was 59% of the raw material. The results of elementary analysis and infrared absorption spectrum confirmed that this product was alpha-ethoxycarbonyl beta-imino gamma-butyrolactone represented by the structural formula:

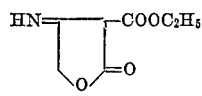

The theoretical values of analysis calculated for $C_7H_9NO_4$ were C, 49.12; H, 4.30; N, 8.19. The actual values were found to be C, 49.03; H, 5.42; N, 7.93.

The crystals produced by reacting chloroacetonitrile, diethyl malonate and stannic chloride in this example were so difficult to refine and the results of the analysis differed from the calculated values, and based on all available evidence that the crystals were a complex having the structural formula:

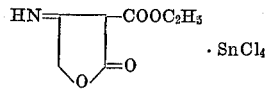

The theoretical values of analysis for $C_7H_9NO_4 \cdot SnCl$ were C, 19.48; H, 2.10; N, 3.25; Cl, 32.86. The actual values were found to be C, 22.11; H, 3.22; N, 2.85; Cl, 35.06; Ash, 13.32.

EXAMPLE 6

26.1 g. of stannic chloride were dropped with stirring into a mixture of 15.2 g. of phenylchloroacetonitrile and 16.0 g. of diethyl malonate at a temperature maintained below 50° C. producing a yellow color. The mixture gradually turned opaque and finally became a sticky solid. After the completion of the dropping, the mixture was heated to and maintained at 80° C. for 1 hour to allow the reaction to proceed to completion. The sticky mixture became solid and evolved a white smoke during the reaction. The product was washed with chloroform and dried to yield 26.6 g., 52% of the nitrile raw material having a melting point in excess of 300° C.

10.2 g. of this solid were heated and dissolved in 100 cc. of ethanol and crystallized from the solution to yield 3.3 g. of white crystals having a melting point of 189 to 190° C. The yield was 67% of the nitrile raw material.

The results of elementary analysis and infrared absorption spectrum confirmed that this product was alpha-ethoxycarbonyl beta-imino gamma-phenyl gamma-butyrolactone represented by the structural formula:

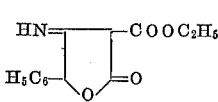

The theoretical values of analysis calculated for $C_{13}H_{13}NO_4$ were C, 63.15; H, 5.30; N, 5.67. The actual values found to be C, 63.89; H, 5.42; N, 5.35.

Further, it was presumed from the results of elementary analysis and infrared absorption spectrum that reacting phenylchloroacetonitrile, diethyl malonate and stannic chloride in this example produced a complex having the structural formula:

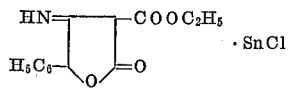

The theoretical values of analysis calculated for $C_{13}H_{13}NO_4 \cdot SnCl_4$ were C, 30.75; H, 2.58; N, 2.76; Cl, 27.93. The actual value were found to be C, 29.31; H, 2.71; N, 2.64; Cl, 28.25.

EXAMPLE 7

2 g. of the complex of alpha-ethoxy carbonyl beta-imino gamma-phenyl gamma-butyrolactone and stannic chloride, the intermediate product in Example 6, were suspended in 50 cc. of water. The suspension was stirred at the room temperature for 8 hours; chloroform was added thereto; the float separated by filtration and discarded. The chloroform layer was separated and washed with an aqueous solution of sodium bicarbonate and water and dried with sodium sulfate. The solvent was distilled away and the residue dissolved in acetone. The solution was concentrated at the room temperature under a reduced pressure to yield 0.3 g. of crystals having a melting point of 184 to 185° C.

This product was confirmed from the infrared absorption spectrum to be identical with the product alpha-ethoxycarbonyl beta-imino gamma-phenyl gamma-butyrolactone in Example 4.

EXAMPLE 8

38 g. of titanium tetrachloride were dropped with stirring into a mixture of 11.5 g. of glycolonitrile and 32 g. of diethyl malonate at a temperature maintained below 60° C., producing color change and increase viscosity until the mixture was a reddish brown viscous syrup. After the completion of the dropping, the product was heated to and maintained at 90° C. under reduced pressure for 3 hours until it solidified. The reaction product was heated and dissolved by the addition of 500 cc. of ethanol, treated with activated carbon and then crystallized. Recrystallization from ethanol produced 12.9 g. of white crystals having a melting point of 213 to 215° C. and a yield of 38.5% of the glycol nitrile.

This product was confirmed by the infrared absorption spectrum to be identical to the product alpha-ethoxycarbonyl beta-imino gamma-butyrolactone of Example 3.

The novel alpha-alkoxycarbonyl beta-imino gamma-butyrolactone of the present invention are useful as herbicides. For example:

Twelve urea resin pots of 1/10,000 each containing 500 g. of air-dried soil, sufficient water added to bring the soil to field moisture and 0.3 g. of commercial fertilizer (18.18–18) pre-mixed with the soil, four pots were seeded with wheat, four with radishes and four with millet and permitted to grow for several days in a greenhouse. After germination, ten individual plants were left in each pot for the experiment, and the others were removed. Two weeks after seeding, 2 ml. of a water suspension of alpha-ethoxycarbonyl beta-imino gamma-phenyl gamma-butyrolactone were sprayed on the stems and leaves of the plants in concentrations of 0.1%, 0.2% and 0.5% respectively.

Two weeks after treatment, each plant was removed, and weighed in order to determine the herbicidal effect of the alpha-ethoxycarbonyl beta-imino gamma-phenyl gamma-butyrolactone.

The experiment was duplicated and the data shown in Table I represents the mean values of the experiments.

TABLE I

| Concentration of alpha-ethoxycarbonyl beta-imino gama-phenyl gamma-butyrolactone | Fresh weight in grams per pot | | |
|---|---|---|---|
| | Wheat | Millet | Radish |
| 0.1% | 35.8 | 40.8 | 63.1 |
| 0.2% | 28.7 | 33.3 | 52.4 |
| 0.5% | 11.5 | 29.3 | 28.5 |
| Untreated control | 37.3 | 57.8 | 102.0 |

What is claimed is:

1. Alpha-alkoxycarbonyl beta-imino gamma-butyrolactones having the formula:

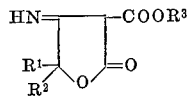

wherein $R^1$ and $R^2$ are selected from the group consisting of hydrogen, lower alkyl radicals having 1–6 carbon atoms and phenyl and $R^3$ is a lower alkyl radical having 1–6 carbon atoms.

2. An alpha-alkoxycarbonyl beta-imino gamma-butyrolactone as claimed in claim 1 wherein said gamma-butyrolactone is selected from the group consisting of alpha-ethoxycarbonyl beta-imino gamma-butyrolactone, alpha-ethoxycarbonyl beta-imino gamma-methyl gamma-butyrolactone, alpha-ethoxycarbonyl beta-imino gamma, gamma-dimethyl gamma-butyrolactone and alph-ethoxycarbonyl beta-imino gamma-phenyl gamma-butyrolactone.

3. A process for producing the alpha-alkoxycarbonyl beta-imino gamma-butyrolactones of claim 1 which comprises reacting nitriles of the general formula:

$$R^1R^2C(Y)CN$$

wherein $R^1$ and $R^2$ are as defined in claim 1 and Y is selected from the group consisting of halogens and hydroxyl radical with malonates of the general formula: $CH_2(COOR^3)_2$ and wherein $R^3$ is as defined in claim 1 in the presence of a metal chloride coordination complex selected from the group consisting of $SnCl_4$ and $TiCl_4$ and decomposing the metal chloride coordination complex reaction product with an agent selected from the group consisting of water, aliphatic lower alcohols and mixtures thereof.

4. A process claimed in claim 3 wherein said metal chloride is added to a mixture of said nitrile and malonate, the temperature is maintained below 80° C. during said addition and the reaction mixture is heated to a temperature between about 80 and 120° C.

5. The process of claim 3 wherein a portion of said agent is an alcohol by-product of the reaction.

6. The process of claim 4 wherein the metal chloride is $SnCl_4$ and Y is a halogen.

7. The process of claim 6 wherein the malonate is diethyl malonate.

8. Alpha-alkoxy beta-imino gamma-butyrolactone complexes having the formula:

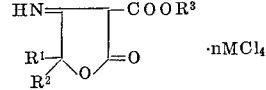

wherein $R^1$ and $R^2$ are selected from the group consisting of hydrogen, lower alkyl radicals having 1–6 carbon atoms and phenyl, $R^3$ is a lower alkyl radical having 1–6 carbon atoms, M is a metal selected from the group consisting of tin and titanium, and $n$ is from about ½ to 1.

9. The complex of claim 8 wherein M is tin and $n$ is 1.

10. The complex of claim 8 wherein M is tin and $n$ is about ½.

References Cited

UNITED STATES PATENTS 2,768,962  10/1956  Krimm _____ 260—343.6

ALEX MAZEL, Primary Examiner

A. M. T. TIGHE, Assistant Examiner

U.S. Cl. X.R.

260—429.5, 429.7, 465, 465.6, 465.7, 471, 482; 71—88